June 6, 1950  L. S. WILLIAMS  2,510,535
STABILIZING FRAME FOR HYDRAULIC SCALES
Filed Feb. 9, 1946  3 Sheets-Sheet 1
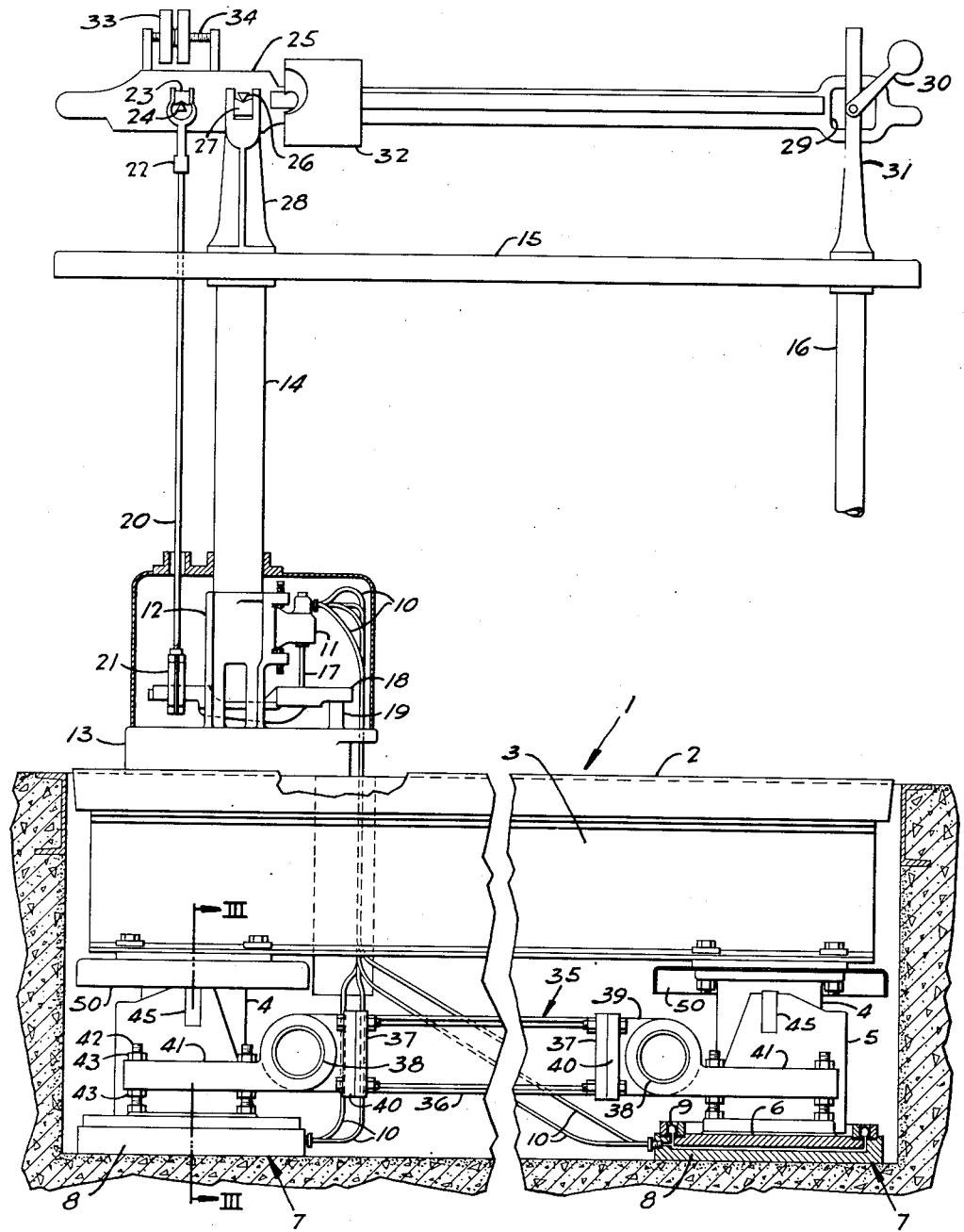
Fig. I
Lawrence S. Williams
INVENTOR
BY Marshall & Marshall
ATTORNEYS

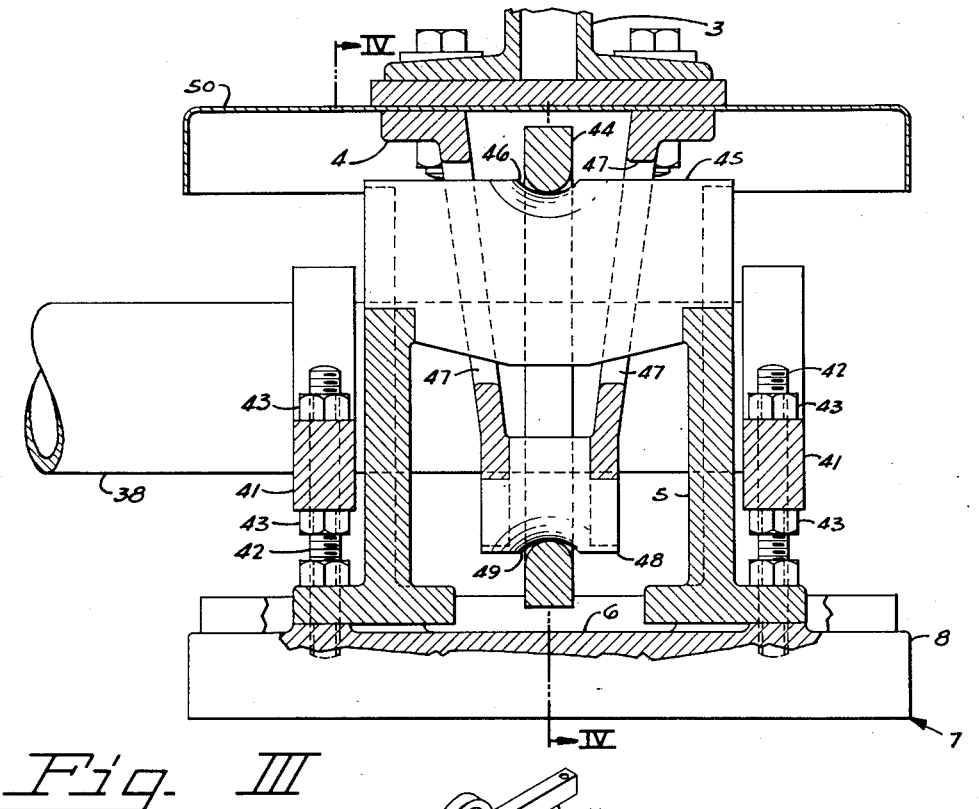
Fig. III
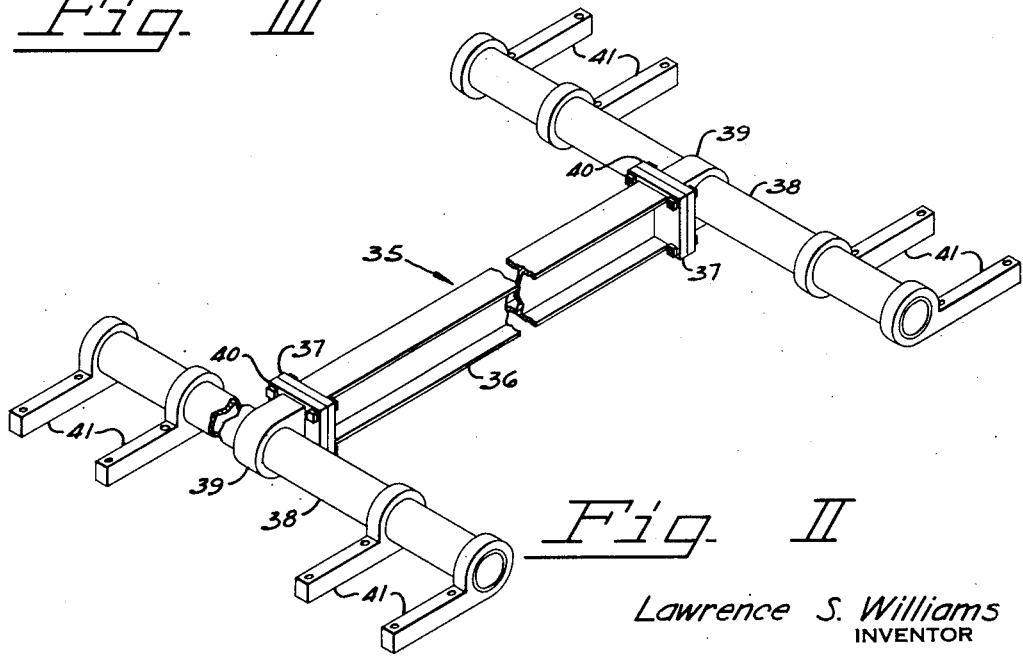
Fig. II
Lawrence S. Williams
INVENTOR
BY Marshall & Marshall
ATTORNEYS June 6, 1950 L. S. WILLIAMS 2,510,535
STABILIZING FRAME FOR HYDRAULIC SCALES
Filed Feb. 9, 1946 3 Sheets-Sheet 3
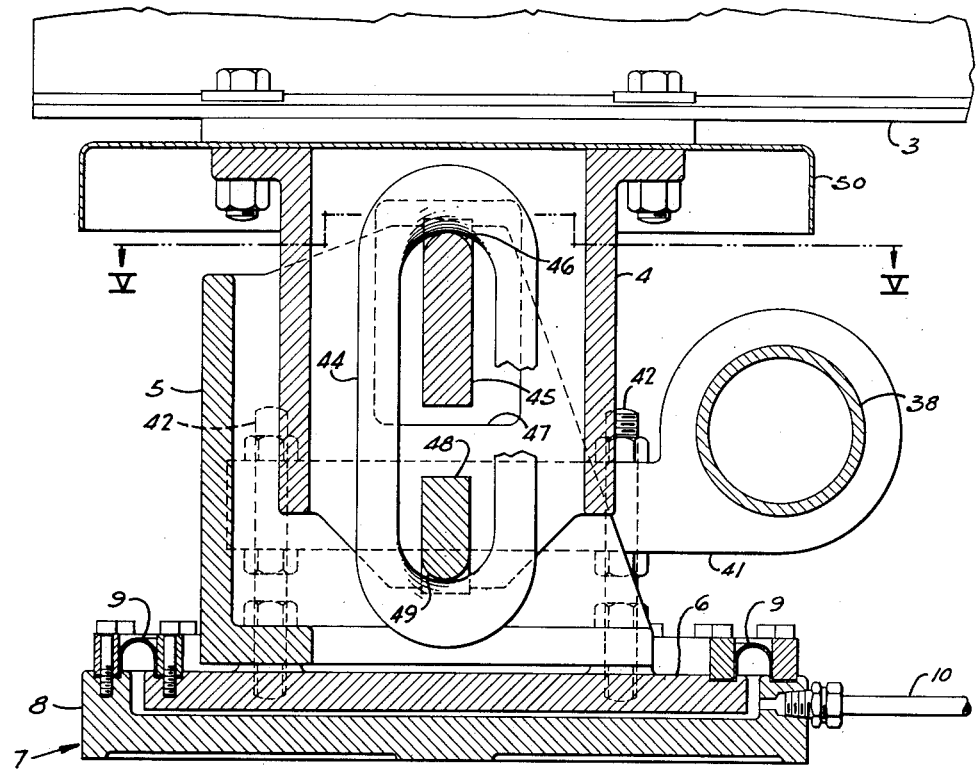
Fig. IV
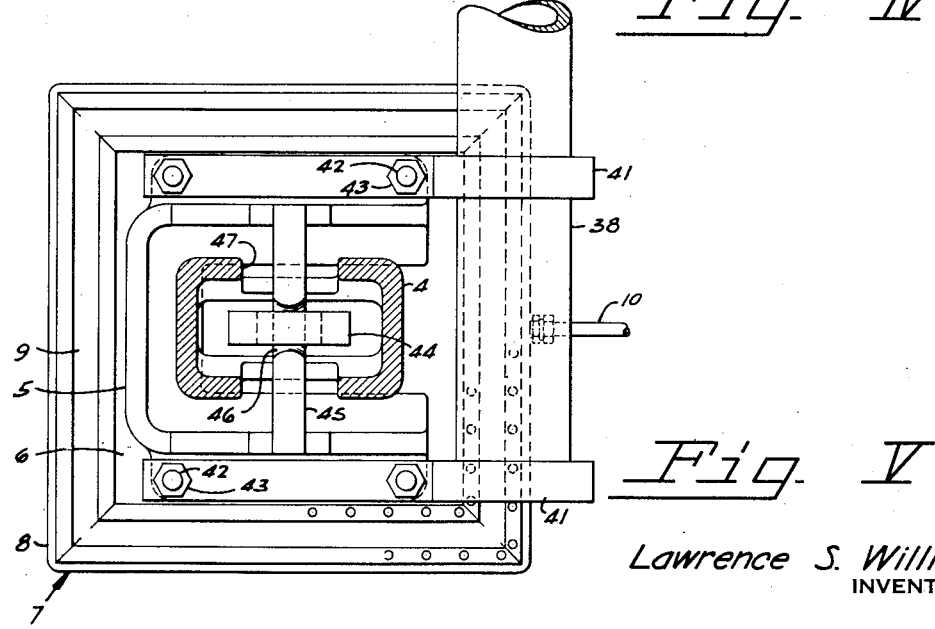
Fig. V
Lawrence S. Williams
INVENTOR
BY Marshall & Marshall
ATTORNEYS Patented June 6, 1950

2,510,535

UNITED STATES PATENT OFFICE 2,510,535

STABILIZING FRAME FOR HYDRAULIC SCALES

Lawrence S. Williams, Toledo, Ohio, assignor to Toledo Scale Company, Toledo, Ohio, a corporation of New Jersey Application February 9, 1946, Serial No. 646,594

2 Claims. (Cl. 265—47)

This invention relates to weighing scales and in particular to means for increasing the accuracy with which load forces are applied to a weight-responsive load-receiver supporting mechanism.

High-precision high-capacity weighing scales show changes in weight indication depending upon the distribution of load on the load receiver. These changes are the result of bending of the girders of the load receiver, the bending causing the girders to slope upwardly at their ends increasing amounts as the load is concentrated at the center of the load receiver. The change in slope changes to a more or less degree the relationship between the elements of the weight-responsive load-receiver support and thus affect the transmission of force to and from the weight-responsive members. In a well constructed and accurately installed lever scale the errors from this cause are negligible. In a weighing scale incorporating hydraulic force transmission elements in which the diaphragms of the hydraulic capsules serving as load-receiver supports remain parallel to the girders, the diaphragms tip when loads are concentrated in the center of the load receiver and the weight indications change accordingly. The change in indication appears to result from the change in projected area of the capsule diaphragm as it is tipped, but the effect is complicated by the spring effect of the membranes of the capsules and the side forces introduced by the tipping. In a lever scale the tipping or change in slope of the ends of the girders produces an end thrust between the bearings and the lever knife edges and thus introduces torsional strains into the levers. These torsional strains may or may not influence the transmission of force through the lever and the accuracy of the weight indication.

The principal object of this invention is to provide a load-receiver supporting system which allows the load receiver to deflect under load without tipping or otherwise disturbing the diaphragms of supporting hydraulic capsules or of introducing end thrust between knife edges and cooperating V bearings.

Another object is to structurally interconnect the diaphragms of a plurality of load supporting hydraulic capsules such that the diaphragms of the capsules are restrained from tipping under the influence of eccentrically applied loads.

Another object of the invention is to provide a lightweight rigid framework for interconnecting and stabilizing the diaphragms of a plurality of hydraulic capsules.

An ancillary object is to provide a force transmitting system between a load receiver and a supporting weight-responsive structure which system permits limited horizontal motion and deflection of the load receiver without transmitting corresponding motions to the weight-responsive supporting structure.

The invention consists in providing the combination of a load receiver, supporting brackets depending from the load receiver, weight-sensitive structure, frames supported by the weight-sensitive structure, a framework interconnecting said frames and means for supporting said brackets from said frames, said means being incapable of transmitting substantial horizontal force.

An example of a stabilizing frame as it is used in a hydraulic weighing scale and load-receiver supporting system whose use is made possible by the stabilizing frame is illustrated in the accompanying drawings.

In the drawings:

Figure I is an elevation, partly in section, of a hydraulic weighing scale embodying the invention.

Figure II is a perspective view of the stabilizing framework.

Figure III is a vertical section taken substantially along the line III—III of Figure I.

Figure IV is a vertical section taken substantially along the line IV—IV of Figure III.

Figure V is a horizontal section taken along the line V—V of Figure IV.

These specific figures and the accompanying description are intended merely to illustrate the invention and not to impose limitations on the claims.

A weighing scale employing hydraulic force transmitting elements has a load receiver 1 consisting of a deck 2 laid on a pair of longitudinally extending girders 3. Depending brackets 4, one attached to the under side of each end of each of the girders 3, fit in loose telescopic engagement with box-like frames 5 attached to the upper surface of diaphragms 6 of hydraulic capsules 7. Each of the hydraulic capsules 7 consists of one of the diaphragms 6 fitting loosely within a recess in a base member 8, and metallic membranes 9 connecting the diaphragm 6 to the adjacent edges of the base member 8 and serving to confine hydraulic fluid within a chamber formed beneath the diaphragm 6.

The membranes 9 are very flexible in bending but strong in tension so that all of the force from the load receiver which is applied to the diaphragms 6 is converted into hydraulic pressure which is communicated through tubes 10 to pressure receivers enclosed within housings 11. The housings 11 are mounted on an upright portion 12 of a beam stand base 13. A pipe standard 14 extending upwardly from the upright portion 12 of the base 13 supports one end of a beam shelf 15 whose other end is supported on a pedestal 16.

Hydraulic forces transmitted through the tubes 10 to the pressure receivers within the housings 11 are converted by bellows contained therein into mechanical force which is transmitted through struts 17 to a gathering lever 18 pivotally mounted on fulcrum stands 19 erected from the base 13. There is a strut 17 and an associated pressure receiver for each of the capsules 7 serving as supports for the load receiver 1. The gathering lever 18 serves to add the forces transmitted from the individual capsules and bellows and to transmit the combined forces to a steelyard rod 20 whose lower end is fitted with a stirrup 21 pivotally connected to the gathering lever 18.

The steelyard rod 20 is suspended from a stirrup 22 whose V bearings 23 rest on a load pivot 24 of a weighbeam 25. The weighbeam 25 has a fulcrum pivot 26 resting on bearings 27 mounted on a fulcrum stand 28 erected from the beam shelf 15. The other end of the weighbeam 25 is fitted with a trig loop 29 which cooperates with a locking plate controlled by a handle 30 mounted on a stand 31 erected from the beam shelf 15. A poise 32 slidable along the length of the weighbeam 25 serves to counterbalance loads applied through the steelyard rod 20 and to indicate the weight of loads applied to the load receiver 1. The beam is balanced at no load and with the poise 32 set at zero by adjustment of balancing weights 33 threaded onto a rod 34 mounted from and parallel to the weighbeam 25.

When hydraulic force transmitting elements are employed in a weighing scale it is highly desirable that all of the load force applied to the hydraulic load supporting element, such as the capsule 7 be converted into hydraulic pressure and that none of the force be supported by the mechanical elements of the capsule, such as the membrane 9. It is also necessary that the effective area of the capsule shall remain constant regardless of the manner in which the load receiver is loaded or the magnitude of the forces applied to the capsule. If the capsule diaphragm is allowed to tip as loads are applied to it, its effective area changes and consequently its force transmission ratio also changes. Since the tipping is a function of the distribution of the load rather than the magnitude of the load it is impossible to adjust the overall calibration of the scale to compensate for the tipping of the diaphragms. The change in indication as the distribution of a load on the load receiver of a hydraulic scale is changed is apparent when the diaphragms of the capsules are rigidly attached to the girders of the load receiver or are connected in a manner such that they remain parallel to the girders of the load receiver at all times.

This unsatisfactory condition is corrected according to the present invention by providing suspension systems between the load receiver and the diaphragms of the hydraulic capsules which systems are incapable of transmitting a bending moment to the capsule diaphragms. Since such a suspension system robs the diaphragm of the support against rotation or tipping afforded by the girders of the load receiver, it is necessary to provide other means to support the capsule diaphragms against tipping forces produced by slight eccentric loading of the diaphragms. According to the invention the additional support is provided by a generally H-shaped, lightweight, rigid framework 35 illustrated in perspective in Figure II. The stabilizing framework comprises a beam 36, which may be an I beam or other conventional shape, having transverse flanges 37 rigidly secured to its ends. When installed the beam 36 lies parallel to the long axis of the load receiver 1. Transverse tubular bars 38 are fitted at their midpoints with collars 39 having flanges 40. The flanges 37 of the beam 36 and the flanges 40 are assembled in juxtaposed relation so that the transverse bars 38 and the beam 36 form the rigid H-shaped frame. A plurality of spaced laterally-extending arms 41 are rigidly secured to each of the transverse tubular bars 38 in position to overlie the diaphragms 6 of the capsules 7 and to straddle the box-like frames 5 erected on the diaphragms 6. A plurality of studs 42 used to secure the box-like frames 5 to the diaphragms 6 also extend through the spaced arms 41 so that nuts 43 threaded on the studs may be used to align and space the diaphragms 6 with respect to the capsule bases 8 and the stabilizing frame 35.

By employing the laterally extending arms 41 and providing the separable bolted connection between the flanges 37 and 40, it is possible to completely assemble the capsules and the load supporting systems mounted thereon before the stabilizing framework is put in place. In the event that a capsule must be removed from service and replaced the stabilizing framework may be easily disassembled to provide access to the capsule and the load-receiver suspension system.

The support provided for the diaphragm 6 by the stabilizing framework 35 makes it possible to use a single link 44 for each of the suspension systems. As illustrated in Figures III, IV and V, the link 44 encircles and is suspended from a cross bar 45 spanning the space between the side walls of the frame 5 and resting in vertical notches cut in the tops of the side walls. The center of the upper surface of the cross bar 45 is provided with a shallow rounded notch 46 which serves to position the link 44 without offering any restraint to swinging motion of the link. The sides of the depending bracket 4 have openings or windows 47 to accommodate the cross bar 45.

The lower end of the depending bracket 4 has its side walls notched upwardly from the bottom to receive and position a short transverse bar 48 whose lower surface has a round notch 49 engaging the lower end of the suspension link 44.

The other corners of the load receiver are similarly supported and because each of the links 44 is swingable in either direction the load receiver is freely swingable without imparting substantial tipping forces to the capsule diaphragms 6. A single link, such as the link 44, when its ends are freely rockable cannot transmit a bending moment from the supported structure to the supporting structure. Therefore the only effect on the capsule produced by a bending of the girders 3 of the load receiver 1 is a slight lateral shift of the bottom end of the bracket 4. This may throw the link 44 slightly out of plumb but the resulting tipping force is small and easily resisted by the stabilizing framework 35. The lateral shift is small because the brackets 4 extend a considerable distance beneath the neutral axis of the girders 3. When the girders bend under a load concentrated at the middle of the deck their ends tend to approach each other slightly as well as to slope upwardly. The bracket depending beneath the neutral axis tends to swing outwardly as the beam bends and the swinging motion is in such direction as to cancel the apparent shortening of the girder produced by its vertical deflection. Whether this neutralizing effect in maintaining the position of the lower end of the brackets 4 invariable with respect to load distribution is complete or not is of little moment because of the small magnitude of the tipping forces produced by the lateral shift of the brackets.

Inasmuch as the operation of certain parts of the capsule or the suspension system may be affected by the accumulation of water or debris falling from above, a shield 50 is installed immediately above the bracket 4 and extends laterally to or beyond a periphery of the capsule base 8. If desired, side walls could be included around the capsule and beneath the shield 50. If side walls are used they must be supported free either of the shield 50 or the capsule base so that they do not form a rigid connection from the load receiver to the foundation.

While a single link load receiver suspension has been illustrated as a suitable force transmitting member, various mechanical equivalents may be substituted without affecting the performance of the weighing scale.

Having described my invention, I claim:

1. A stabilizing frame for a weighing scale employing a hydraulic force transmitting element including a plurality of load supporting capsules that are individually incapable of resisting tipping forces, the stabilizing frame comprising a first bar that extends parallel to and adjacent a first side of each of a pair of the load supporting capsules, a plurality of arms rigidly attached to the bar and extending at right angles to the bar to overlie marginal portions of second and third sides of the tippable part of the capsule, said arms and said bar extending along the three sides of load supporting structure erected on the capsule not including the side opposite the bar whereby the bar and arms may be assembled to or removed from the capsule by movement perpendicular to the bar without disassembly of the load supporting structure, a second bar positioned adjacent others of the load supporting capsules and similarly attached thereto, and a beam interconnecting the first and second bar for preventing rotation of each bar.

2. A stabilizing frame for a weighing scale employing hydraulic force transmitting elements including a plurality of load supporting capsules that are individually incapable of resisting tipping forces, the stabilizing frame comprising a first bar that extends parallel to and adjacent a first side of each of a pair of load supporting capsules, a plurality of arms rigidly attached to the bar and extending at right angles to the bar to lie along second and third sides of each of the pair of capsules, means for rigidly attaching the arms to the tippable portions of the capsules, a beam that is rigidly attached to the bar and that extends laterally therefrom, and means for connecting the beam to the tippable portion of at least one other capsule to prevent rotation of said bar.

LAWRENCE S. WILLIAMS.

REFERENCES CITED

The following references are of record in the file of this patent:

UNITED STATES PATENTS

| Number | Name | Date |
| --- | --- | --- |
| 2,279,912 | Bohannan | Apr. 14, 1942 |
| 2,359,721 | Williams | Oct. 3, 1944 |